United States Patent [19]
Fischer

[11] Patent Number: 5,688,099
[45] Date of Patent: Nov. 18, 1997

[54] TILTABLE DUAL BEDS TRAILER

[76] Inventor: Terry D. Fischer, R.R. 1, Box 155, Harvey, N. Dak. 58341

[21] Appl. No.: 574,160

[22] Filed: Dec. 18, 1995

[51] Int. Cl.⁶ .................................. B60P 1/28; B65G 67/02
[52] U.S. Cl. .................. 414/537; 414/482; 414/484; 410/3; 410/7
[58] Field of Search .......................... 414/537, 538, 414/480, 481, 482, 483, 484, 485; 410/3, 7; 280/400, 656; 14/71.1

[56] References Cited

U.S. PATENT DOCUMENTS

| | | | |
|---|---|---|---|
| 1,941,400 | 12/1933 | Johnson | 414/477 |
| 2,408,862 | 10/1946 | Lisota | 414/483 |
| 2,954,137 | 9/1960 | Ash | 414/483 |
| 2,995,399 | 8/1961 | Riseborough | 414/483 |
| 3,051,336 | 8/1962 | Felsten | 414/537 |
| 4,014,444 | 3/1977 | Jakel | 414/537 |
| 4,144,979 | 3/1979 | Leach, Jr. et al. | 14/71.1 |
| 4,168,932 | 9/1979 | Clark | 414/483 |
| 4,673,328 | 6/1987 | Shiels | 414/471 |
| 5,203,655 | 4/1993 | Persau | 410/3 |
| 5,342,162 | 8/1994 | Robinette et al. | 414/483 |

*Primary Examiner*—Karen B. Merritt
*Assistant Examiner*—Stephen Gordon
*Attorney, Agent, or Firm*—David A. Lingbeck

[57] ABSTRACT

A tiltable dual beds trailer includes a main frame with a floor thereon and a pair of rear frames having removable floors thereon and being hingedly attached at a medial portion thereof to the rear end of the main frame such that the rear frames are essentially balanced upon the main frame. The floors on the rear frames can be easily removed to allow the user convenient access under any machines or vehicles loaded on the rear frames. The tiltable dual beds trailers also has a pair of gate/ramps hingedly attached to the front end of the main frame to allow an object or objects to be off-loaded from the front of the trailer.

15 Claims, 6 Drawing Sheets

5,688,099

TILTABLE DUAL BEDS TRAILER

BACKGROUND OF THE INVENTION

The present invention relates to a trailer having dual beds which tilt independently of one another for independent loading of objects such as snowmobiles and further having a main bed which is forward of the tiltable dual beds.

It is not uncommon to find trailers with a single bed which either lowers to the ground or tilts backward so that an object or objects can be loaded upon the bed for transportation.

One known prior art is a RAMP LOADER, U.S. Pat. No. 2,954,137, issued on Sep. 27, 1960 and invented by Charles S. Ash, comprising a frame mounted upon at least one wheeled axle and a bed capable of having its back end lowered to the ground for easy loading of the trailer.

Another known prior art is a WRECKING CAR, U.S. Pat. No. 1,941,400, issued on Dec. 26, 1933 and invented by Vernon W. Johnson, comprising a main body having a middle portion supported upon a wheeled axle and an auxiliary body being supported upon the main body for relative longitudinal sliding movement.

Another known prior art is a VEHICLE BED UNLOADING DEVICE, U.S. Pat. No. 2,408,862, issued on Oct. 8, 1946 and invented by Edward Lisota, comprising a main frame including a front section and a rear section which is rearwardly tiltable, and a bed supported by the main frame.

Another known prior art is a LIFT/TILT-BED TRAILER, U.S. Pat. No. 4,673,328, issued on Jun. 16, 1987 and invented by J. Michael Shiels, comprising a U-shaped frame, four pivotal tracks attached to the frame, rollers disposed in the tracks, and a bed mounted to the rollers.

None of the prior art described above includes a plurality of beds, two of which are independently tiltable of one another and further includes means for off-loading the object or objects from the front end of the trailer.

SUMMARY OF THE INVENTION

This invention relates to a trailer having multiple beds, two of which are independently tiltable of one another and further having a pair of gate/ramps hingedly attached to the front end of the main frame for easy and convenient off-loading of an object or objects from the trailer and also having floors which are removable.

One objective of the present invention is to provide a tiltable dual beds trailer which allows the user to load and secure part of the load before loading the rest onto the trailer.

Another objective of the present invention is to provide a tiltable dual beds trailer which eliminates having to carry along ramps to load and unload the trailer.

Also, another objective of the present invention is to provide a tiltable dual beds trailer which allows the user to load construction material on the trailer first and then load a vehicle such as an ATV without disturbing the loaded construction material.

Further, another objective of the present invention is to provide a tiltable dual beds trailer which allows the user to drive onto the trailer and to drive straight off the trailer without having to back off the trailer.

Yet, another objective of the present invention is to provide a tiltable dual beds trailer which has removable floors in the tiltable dual beds to allow the user to work under machines or vehicles loaded onto the trailer.

Further objectives and advantages of the present invention will become apparent as the description proceeds and when taken in conjunction with the accompanying drawings wherein:

DETAILED DESCRIPTION OF THE INVENTION

Figure 1:
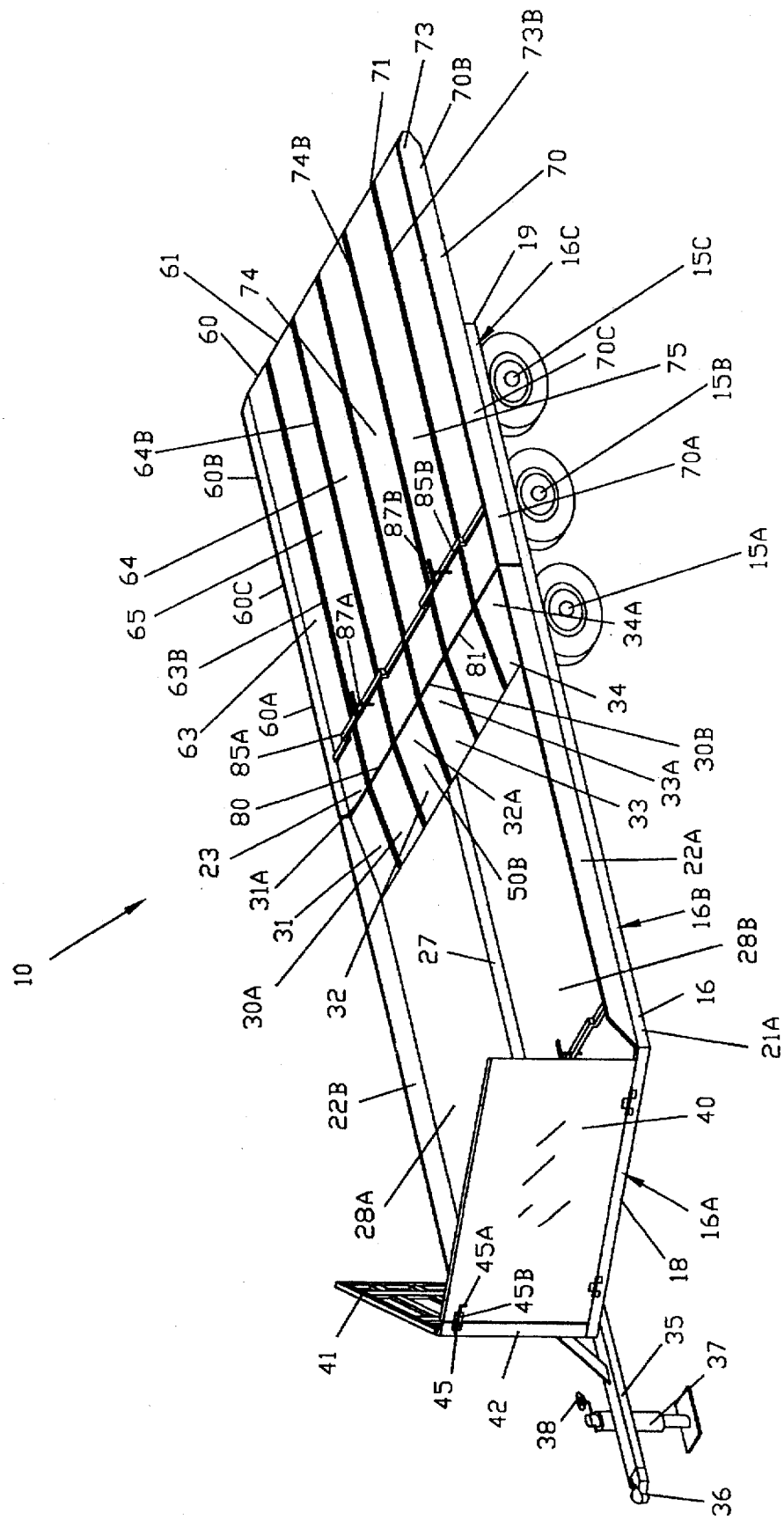
FIG. 1 is a top/front perspective view of the tiltable dual beds trailer.
Figure 2:
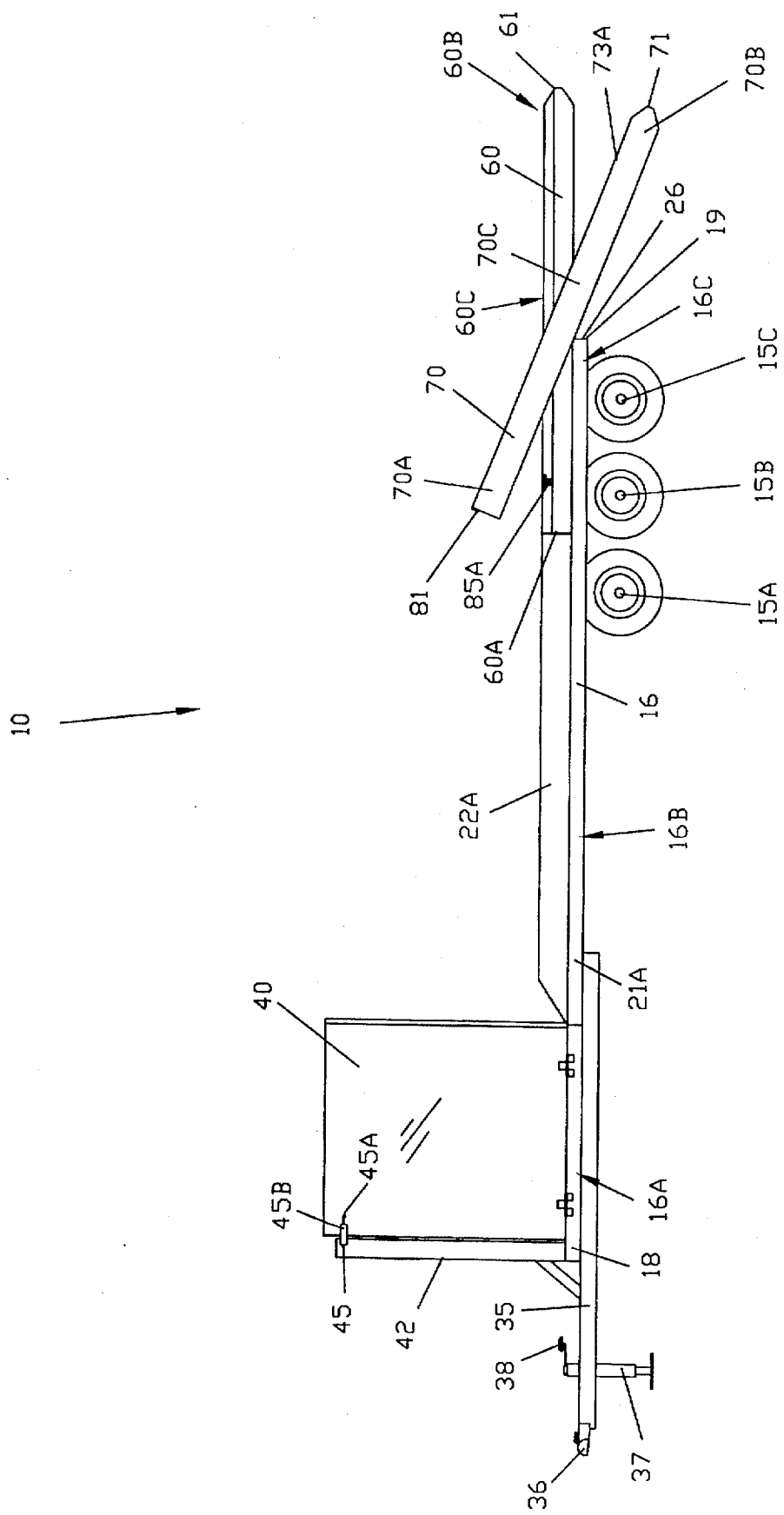
FIG. 2 is a side elevation view of the tiltable dual beds trailer with one of the beds tilted and the other bed not tilted.
Figure 3:
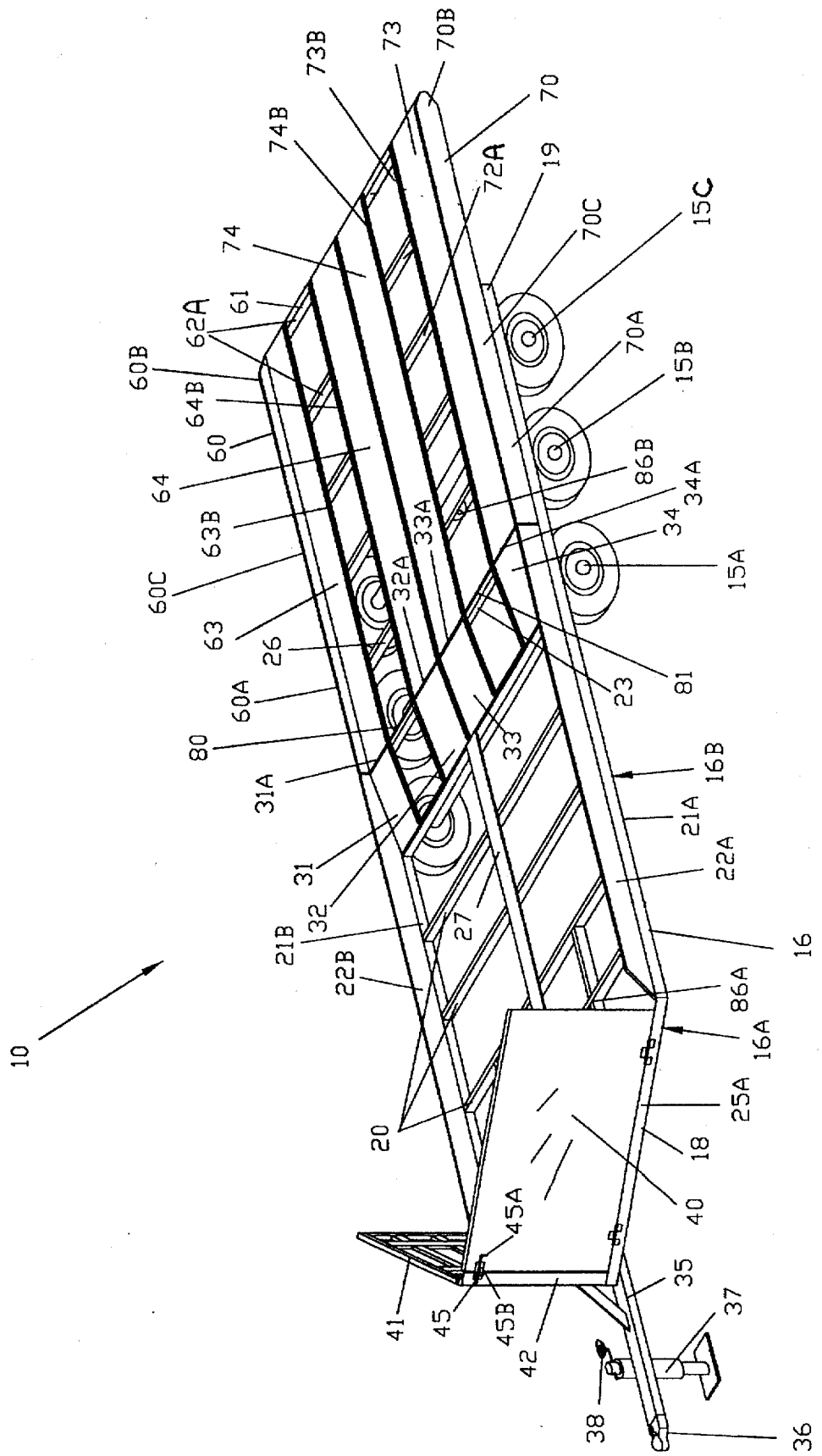
FIG. 3 is a top/front perspective view of the tiltable dual beds trailer with the floors on the tiltable dual beds removed.
Figure 4:
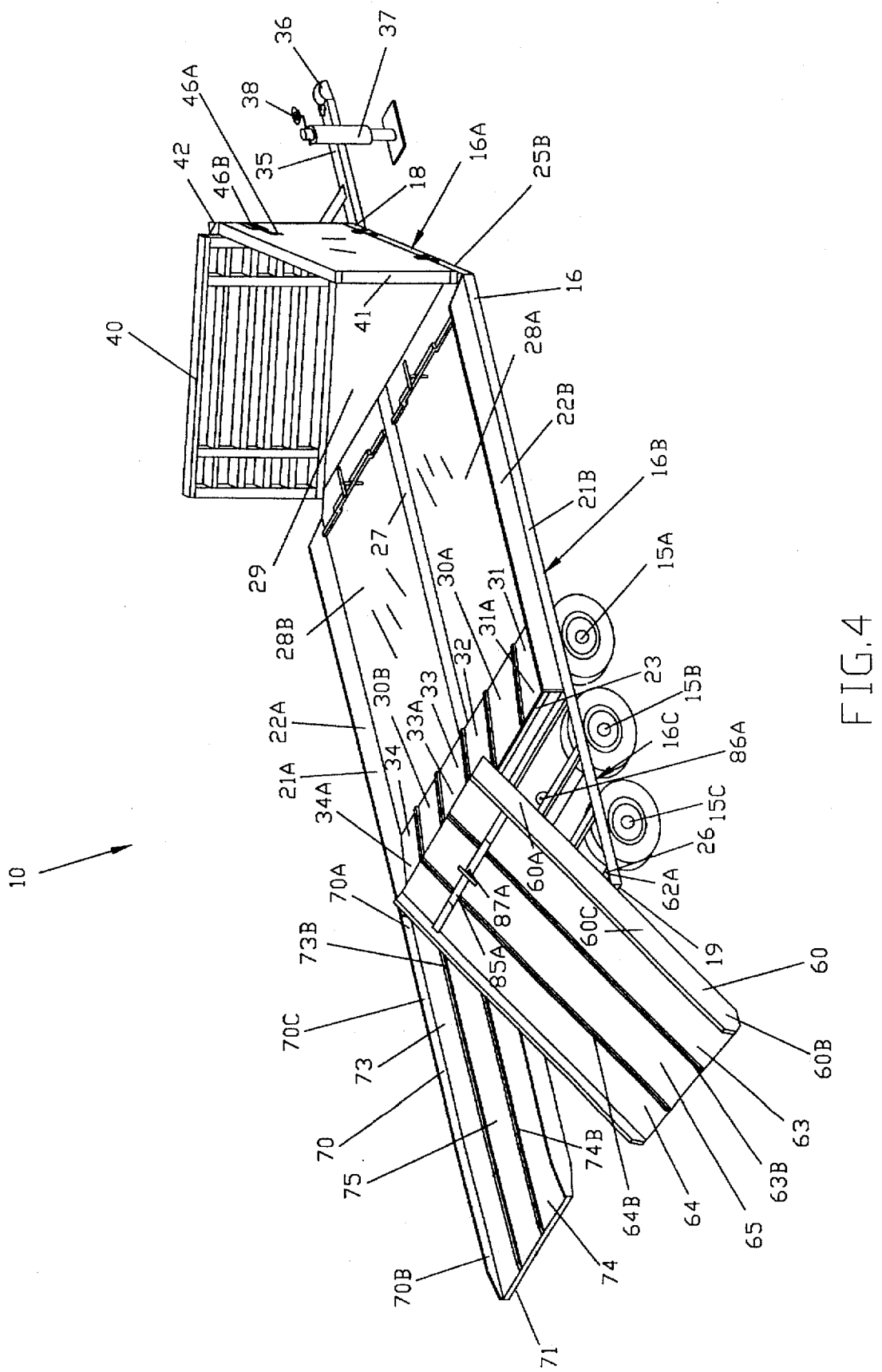
FIG. 4 is a top/rear perspective view of the tiltable dual beds trailer with one of the beds being tilted.
Figure 5:
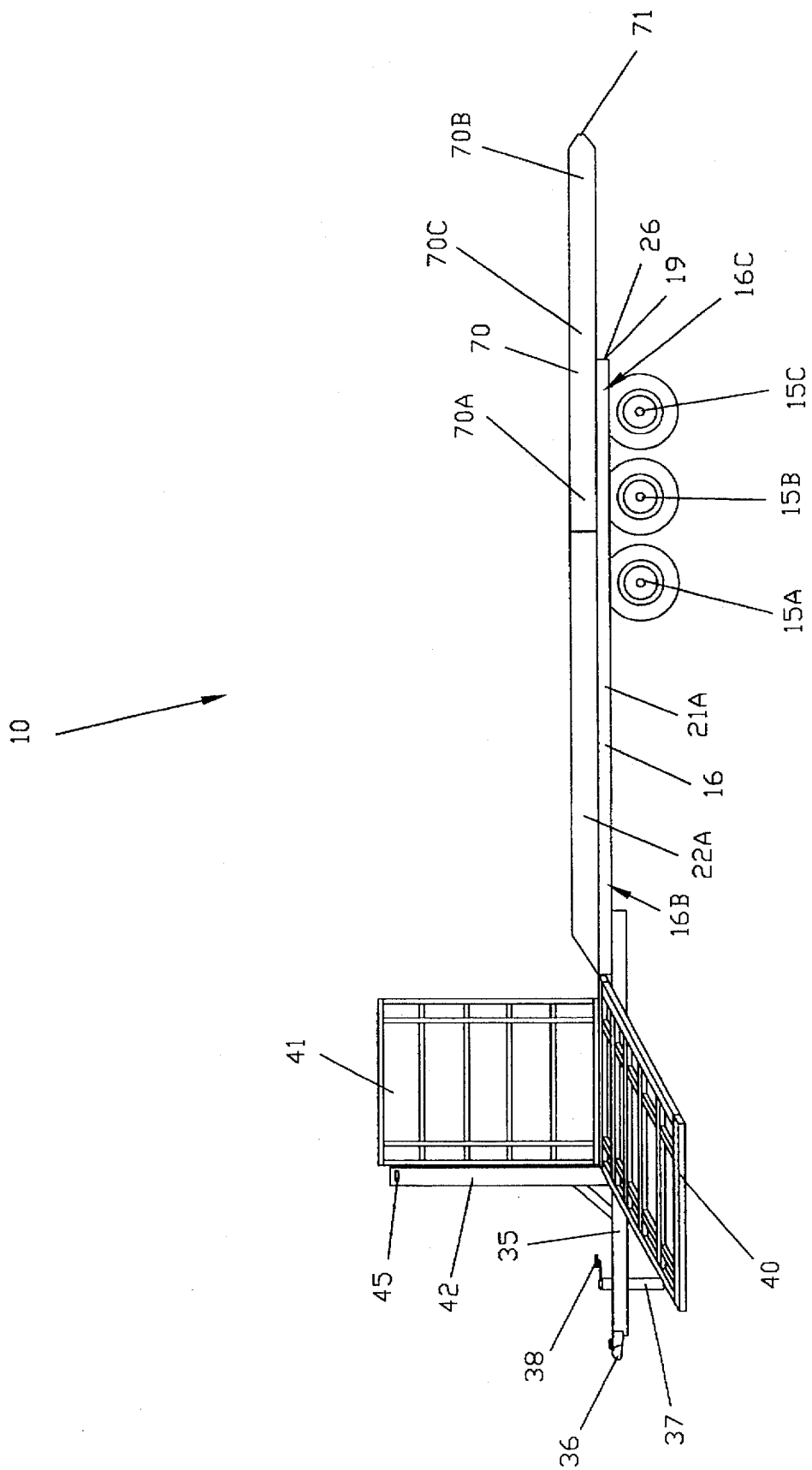
FIG. 5 is a side elevation view of the tiltable dual beds trailer with one of the front end gate/ramps lowered to the ground.
Figure 6:
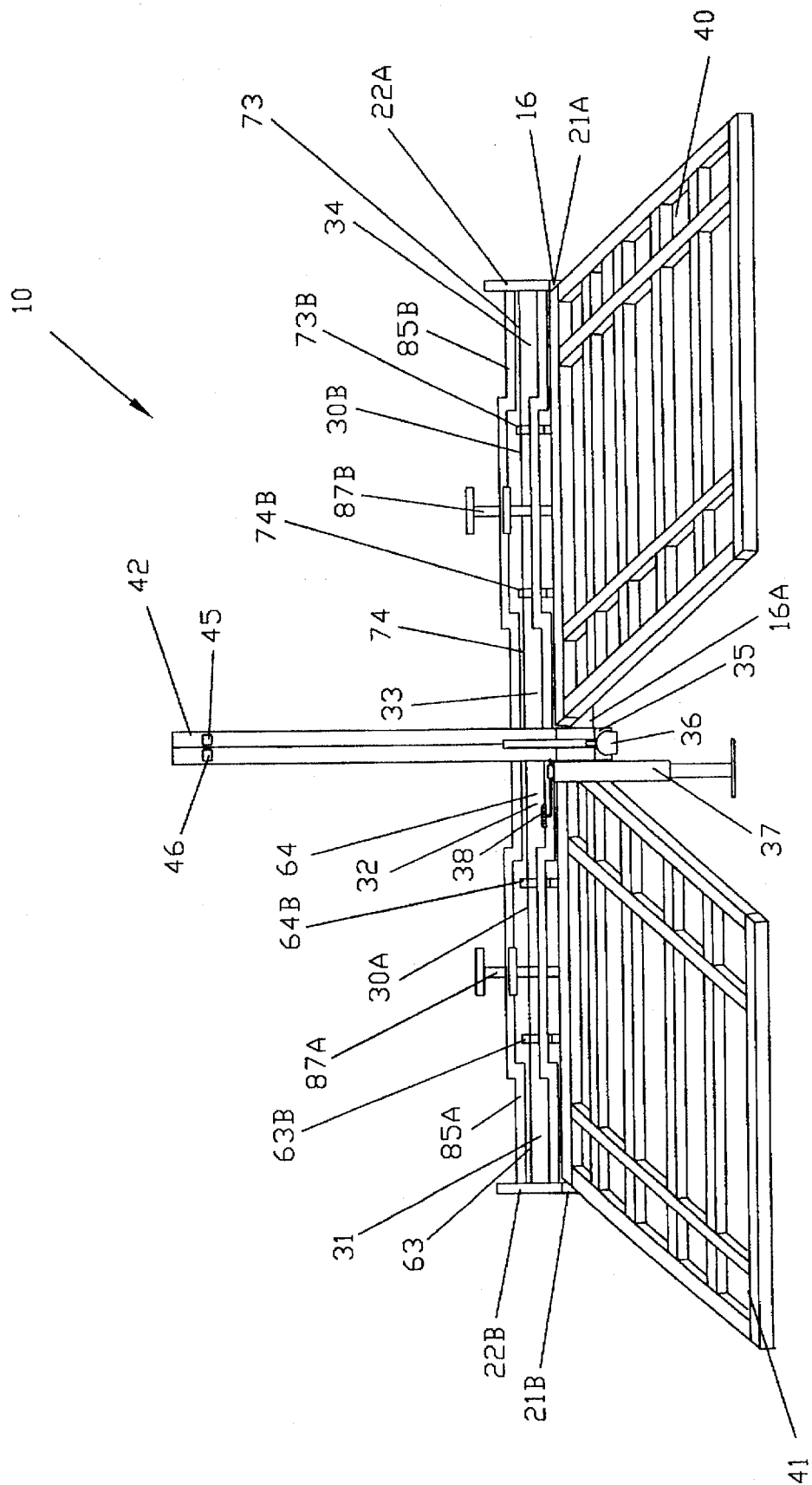
FIG. 6 is a front elevation view of the tiltable dual beds trailer with both of the front end gate/ramps lowered to the ground.

Referring to the drawings in FIGS. 1–6, the tiltable dual beds trailer 10 comprises a main frame 16 mounted upon three wheeled axles 15a–c and having a forward portion 16a to which a tongue 35 is fixedly attached and extends forward therefrom, a middle portion 16b, and a rearward portion 16c, and further having two elongate side members 21a–b mounted upon and interconnected by a plurality of spaced apart cross members 20 and also having two forward converging members 25a–b at the front end 18 of the main frame 16 to form an inverted V shape, and having a raised cross member 23 near the rear end 19 of the main frame 16, the raised cross member 23 being fixedly attached at its ends to the sides of the two side members 21a–b but being elevated vertically relative to the other cross members 20 which are essentially aligned horizontally to one another. Two side rails 22a–b which function as barriers so that the object or objects loaded onto the trailer 10 do not slide or roll off the trailer 10, are each fixedly attached upon a respective side member 21a–b.

The main frame 16 supports a floor which is separated into a number of floor sections. A forward floor section 29 is mounted upon the forward portion 16a of the main frame 16, and two main floor sections 28a–b are mounted essentially in a side-to-side alignment arrangement with an elongate spacer 27 being longitudinally disposed and separating the two main floor sections 28a–b upon the middle portion 16b of the main frame 16. On the rearward portion 16c of the main frame 16, two pairs of track members 31–34 are fixedly mounted, one pair of track members 33–34 being mounted on the left half of the rearward portion 16c and being spaced apart from one another with the space between the two left side track members 33–34 being essentially equal to the space between two snowmobile skis on a snowmobile and the other pair of track members 31–32 being mounted likewise on the right half of the rearward portion 16c. Each of the track members 31–34 has an outwardly turned lip portion extending along the longitudinal edge of the track member 31–34, which is on the side facing the opposed track member in the same pair. One rearward floor section 30a is engaged between one pair of track members 31–32 and securely held down by the lip portions on the track members 31–32 and another rearward floor section 30b is likewise engaged between the other pair of track members 33–34. The back ends 31a–34a of the track members 31–34 and the rearward floor sections 30a–b are fixedly mounted upon the raised cross member 23.

As shown in FIGS. 1–5, the dual tiltable beds trailer 10 also comprises a pair of tiltable rear frames 60,70 each of which has a front end, a back end 61,71, a forward portion 60a,70a and a rearward portion 60b,70b, and further comprises a plurality of spaced apart cross members 62,72 interconnected by a pair of tracks 63,64,73,74 which are fixedly mounted or welded upon the cross members 62,72 and which extend from the back end 61,71 to the front end of the respective tiltable rear frame 60,70 with the tracks 63,64,73,74 in each pair being spaced from one another with the space being generally equal to the space between two skis on one snowmobile so that the skis on the snowmobile can move upon the tracks 63,64,73,74 when the snowmobile is being driven upon the trailer 10. Like the track members 31-34, the tracks 63,64,73,74 have an outwardly turned lip portion 63b,64b,73b,74b which extends along the longitudinal edge of the track 63,64,73,74 which is on the side facing the other track in the same pair. Two removable floors 65,75 are slidably engaged between the two pairs of tracks 63,64,73,74 with the lip portions 63b,64b,73b,74b overlaying the top side edges of the removable floors 65,75 to prevent the removable floors 65,75 from coming up out of between the pairs of tracks 63,64,73,74. The two removable floors 65,75 can be easily slid forwardly or rearwardly upon the cross members 62,72 of the two tiltable rear frames 60,70 and can be removed from the rear frames 60,70 to allow the user easy and convenient access to the undersides of any machines or vehicles loaded upon the two tiltable rear beds 60,70. The user can slide beneath the tiltable rear frames 60,70 and can reach up through the opening between the tracks 63,64,73,74 when the removable floors 65,75 are removed. This feature is especially convenient for-users who have tractor lawn mowers which can be loaded upon the two tiltable rear beds 60,70 and the blades can be removed without the user having to tip over the tractor to gain access to the blades.

The two tiltable rear frames 60,70 have respective medial portions 60c,70c each of which has a centrally-disposed cross member 62a,72a which is hingedly connected with conventional hinges to a rear cross member 26 of the main frame 16 such that the back ends 61,71 of the two tiltable rear frames 60,70 can be lowered to the ground with the front end of the tiltable rear frames 60,70 being raised upwardly. The two tiltable rear frames 60,70 are essentially aligned side-by-side behind and upon the rear portion 16c of the main frame 16 with the forward portions 60a,70a resting upon the main frame 16 when the tiltable rear frames 60,70 are placed in a horizontal transport position and with the rearward portions 60b,70b extending rearward beyond the main frame 16. The tiltable rear frames 60,70 are essentially balanced upon a fulcrum which is essentially the rear cross member of the main frame 16 such that the user can easily raise and lower the back ends 61,71 of the tiltable rear beds 60,70 even with any object or objects being loaded thereon. A pair of conventional trip latches 80,81 each having a spring loaded latch are used to secure the tiltable rear frames 60,70 in a horizontal transport position with the tripper latches 80,81 being fixedly attached to the raised cross member 23 of the main frame 16 and releaseably latching the tiltable rear frames 60,70 to the raised cross member 23.

To further secure the tiltable rear frames 60,70 in a horizontal transport position, a plurality of brackets 86a-b are fixedly attached to one of the cross members 20 of the main frame 16, and tie down bars 85a-b, for the skis on snowmobiles are fastened to and upon the removable floors 65,75 with threaded members 87a-b, being threaded through both the tie down bars 85a-b and the brackets 86a-b which are vertically aligned beneath the tie down bars 85a-b when the tiltable rear frames 60,70 are in a horizontal transport position.

In addition to an object or objects being off-loaded from the tiltable rear beds 60,70, the objects or objects can be off-loaded from the front 18 of the trailer 10. As shown in FIGS. 1-6, a pair of gate/ramps 40,41 are hingedly attached with hinges along the bottom edges of the gate/ramps 40,41 and on the top edges of the two forward converging members 25a-b. The top ends of the gate/ramps 40,41 can be swung upon the hinges and lowered to the ground independently of one another, and the object or objects on the trailer 10 can be moved upon the gate/ramps 40,41 and off the trailer 10. In a transport position, the top ends of the gate/ramps 40,41 are swung upward with the gate/ramps 40,41 being in an upright position and being secured with a pair of latch members 45a,46a to a post 42 which is fixedly attached to the joint formed by the two forward converging members 25a-b and which extend upwardly therefrom. A pair of conventional latch keepers 45,46 are fixedly attached to near the top end of the post 42 for receiving the two latch members 45a,46a which are supported by two brackets 45b,46b, when the gate/ramps 40,41 are in an upright position. The gate/ramps 40,41 are made of steel tubing and sheets of steel so that even motorized vehicles can be driven upon the gate/ramps 40,41 and off the trailer 10 which has a tongue 35 fixedly attached to the main frame 16 and extending forwardly therefrom with a ball-receiving hitch 36 at the front end of the tongue 35 for hitching to a prime mover. A conventional jack 37 having a crank 38 and a base is attach to the tongue 35 so that the tongue 35 can be mechanically raised and lowered by the jack 37 to the height of the hitch on the prime mover instead of the user having to manually lift the tongue 35 to hitch the trailer 10 to the prime mover.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A tiltable dual beds trailer comprising:

a main frame mounted upon at least one wheeled axle and having a plurality of cross members and side members and further having a front end and a rear end;

a floor disposed upon said main frame;

a pair of independently tiltable rear frames hingedly attached to said rear end of said main frame and having a plurality of cross members and being disposed side-by-side;

a pair of removable floors each of which is slidably mounted upon a respective one of said tiltable rear frames;

a pair of gate/ramps hingedly attached to said front end of said main frame;

a post fixedly attached upon said front end of said main frame and extending upward therefrom for latchably securing said gate/ramps in an upright travel position; and a tongue attached to and extending forward of said main frame and having a hitching means for hitching said trailer to a prime mover.

2. A tiltable dual beds trailer as described in claim 1, wherein said main frame further has a pair of forward converging members upon which said gate/ramps are hingedly attached such that said gate/ramps are capable of swinging downward to the ground to load and unload said trailer.

3. A tiltable dual beds trailer as described in claim 2, wherein said main frame has a raised cross member relative to said other cross members of said main frame, said tiltable rear frames being releasably latched to said raised cross member.

4. A tiltable dual beds trailer as described in claim 3, wherein said raised cross member is forward of said rear end of said main frame.

5. A tiltable dual beds trailer as described in claim 4, further comprises two pairs of track members mounted upon said main frame near said rear end thereof to facilitate loading and unloading of said trailer.

6. A tiltable dual beds trailer as described in claim 5, wherein each of said tiltable rear frames further includes a pair of tracks spaced apart from one another and fixedly mounted upon said cross members of said respective tiltable rear frame.

7. A tiltable dual beds trailer as described in claim 6, wherein each of said track members has a back end which is fixedly mounted upon said raised cross member of said main frame.

8. A tiltable dual beds trailer as described in claim 7, wherein each of said tracks is longitudinally aligned with a respective one of said track members when said tiltable rear frames are latched to said main frame and disposed horizontally in a transport position.

9. A tiltable dual beds trailer as described in claim 8, wherein each of said tiltable rear frames are hingedly attached along a medial portion thereof to a rear cross member of said plurality of main frame cross members of said main frame such that said respective tiltable rear frame essentially balances upon said main frame and can be conveniently and easily tilted and placed into a horizontal transport position.

10. A tiltable dual beds trailer as described in claim 9, wherein each of said tiltable rear frames has a forward portion and a rearward portion and has a centrally disposed cross member of said cross members thereof which is hingedly attached to said rear cross member of said main frame such that said forward portion of said respective tiltable rear frame rests upon said main frame when said respective tiltable rear frame is latched to said main frame in a horizontal transport position with said rearward portion extending rearward beyond said main frame.

11. A tiltable dual beds trailer as described in claim 10, wherein each of said tracks further has an outwardly turned lip portion extending along a longitudinal edge thereof, said lip portions of each pair of said tracks in cooperation with one another securely holding, a respective one of said removable floors therebetween and upon said respective tiltable rear frame.

12. A tiltable dual beds trailer as described in claim 11, wherein each of said tiltable rear frames has a back end capable of resting upon the ground when said respective tiltable frame is tilted for easy and convenient loading and unloading of said trailer.

13. A tiltable dual beds trailer as described in claim 12, further includes means to further secure each of said tiltable rear frames in a horizontal transport position.

14. A tiltable dual beds trailer as described in claim 13, wherein said means to further secure each of said tiltable rear frames includes at least one bracket fixedly attached to one of said cross members of said main frame, at least one tie down bar, and at least one threaded member for threading said at least one tie down bar upon either of said removable floors and threading through said at least one bracket.

15. A tiltable dual beds trailer as described in claim 2, wherein said post is fixedly attached to a joint formed by said forward converging members and is fittingly disposed between said gage/ramps when said gate/ramps are in an upright position.

* * * * *